United States Patent
Yokose

(10) Patent No.: US 8,649,051 B2
(45) Date of Patent: Feb. 11, 2014

(54) IMAGE COMPOSITION DEVICE, IMAGE FORMING APPARATUS AND COMPUTER READABLE MEDIUM STORING PROGRAM

(75) Inventor: Taro Yokose, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1088 days.

(21) Appl. No.: 12/542,355

(22) Filed: Aug. 17, 2009

(65) Prior Publication Data
US 2010/0225971 A1    Sep. 9, 2010

(30) Foreign Application Priority Data

Mar. 4, 2009  (JP) ................. 2009-050097

(51) Int. Cl.
*G06K 15/02*    (2006.01)
(52) U.S. Cl.
USPC ..................... 358/1.18; 358/1.1; 358/1.14
(58) Field of Classification Search
USPC ................................. 358/1.1, 1.18
See application file for complete search history.

(56) References Cited

FOREIGN PATENT DOCUMENTS

| JP | A-05-083524 | 4/1993 |
|---|---|---|
| JP | A-05-211601 | 8/1993 |
| JP | A-2002-326401 | 11/2012 |

OTHER PUBLICATIONS

Dec. 13, 2012 Office Action issued in Japanese Patent Application No. 2009-050097 (with English translation).

*Primary Examiner* — King Poon
*Assistant Examiner* — Iriana Cruz
(74) *Attorney, Agent, or Firm* — Oliff PLC

(57) ABSTRACT

An image composition device includes: a determination unit that determines an overlap state between respective pixel strings on corresponding lines in plural first image data pieces, having plural continuous pixels in the same color as a pixel string, including continuous coordinates with start point coordinate information and end point coordinate information of the pixel string, using the plural first image data pieces; and a composition unit that composes plural second image data pieces based on a result of determination by the determination unit.

19 Claims, 15 Drawing Sheets

OVERWRITE CONTINUOUS COORDINATE DATA
(CONTINUOUS COORDINATE DATA OF OVERWRITE IMAGE)

| START POINT | END POINT | COLOR INFORMATION ||||
|---|---|---|---|---|---|
| | | Y | M | C | K |
| 8 | 19 | 42 | 92 | 5 | 123 |
| 22 | 45 | 7 | 186 | 24 | 88 |
| 59 | 108 | 88 | 5 | 70 | 288 |
| 202 | 279 | 86 | 44 | 98 | 88 |

OVERWRITE CONTINUOUS COORDINATE
DATA AS SUBJECT OF COMPARISON

| 22 | 45 | 7 | 186 | 24 | 88 |
|---|---|---|---|---|---|

BASE CONTINUOUS COORDINATE DATA
(CONTINUOUS COORDINATE DATA OF BASE IMAGE)

| START POINT | END POINT | COLOR INFORMATION ||||
|---|---|---|---|---|---|
| | | Y | M | C | K |
| 35 | 51 | 10 | 48 | 176 | 34 |
| 68 | 79 | 12 | 53 | 196 | 35 |
| 89 | 189 | 21 | 55 | 188 | 49 |
| 289 | 376 | 18 | 78 | 220 | 35 |
| 412 | 509 | 27 | 70 | 177 | 88 |
| 521 | 569 | 30 | 96 | 101 | 88 |

BASE CONTINUOUS COORDINATE
DATA AS SUBJECT OF COMPARISON

| 35 | 51 | 10 | 48 | 176 | 34 |
|---|---|---|---|---|---|

IMAGE COMPOSITION AND OUTPUT

| START POINT | END POINT | COLOR INFORMATION ||||
|---|---|---|---|---|---|
| | | Y | M | C | K |
| 8 | 19 | 42 | 92 | 5 | 123 |
| 22 | 45 | 7 | 186 | 24 | 88 |
| 46 | 51 | 10 | 48 | 176 | 34 |

CONTINUOUS COORDINATE DATA OF COMPOSITE IMAGE

FIG. 7

OVERWRITE CONTINUOUS COORDINATE DATA
(CONTINUOUS COORDINATE DATA OF OVERWRITE IMAGE)

| START POINT | END POINT | COLOR INFORMATION | | | |
|---|---|---|---|---|---|
| | | Y | M | C | K |
| 8 | 19 | 42 | 92 | 5 | 123 |
| 22 | 45 | 7 | 186 | 24 | 88 |
| 59 | 108 | 88 | 5 | 70 | 288 |
| 202 | 279 | 86 | 44 | 98 | 88 |

OVERWRITE CONTINUOUS COORDINATE DATA AS SUBJECT OF COMPARISON

| START POINT | END POINT | COLOR INFORMATION | | | |
|---|---|---|---|---|---|
| | | Y | M | C | K |
| 22 | 45 | 7 | 186 | 24 | 88 |

BASE CONTINUOUS COORDINATE DATA
(CONTINUOUS COORDINATE DATA OF BASE IMAGE)

| START POINT | END POINT | COLOR INFORMATION | | | |
|---|---|---|---|---|---|
| | | Y | M | C | K |
| 35 | 51 | 10 | 48 | 176 | 34 |
| 68 | 79 | 12 | 53 | 196 | 35 |
| 89 | 189 | 21 | 55 | 188 | 49 |
| 289 | 376 | 18 | 78 | 220 | 35 |
| 412 | 509 | 27 | 70 | 177 | 88 |
| 521 | 569 | 30 | 96 | 101 | 88 |

BASE CONTINUOUS COORDINATE DATA AS SUBJECT OF COMPARISON

| START POINT | END POINT | COLOR INFORMATION | | | |
|---|---|---|---|---|---|
| | | Y | M | C | K |
| 35 | 51 | 10 | 48 | 176 | 34 |

⇒ IMAGE COMPOSITION AND OUTPUT

| START POINT | END POINT | COLOR INFORMATION | | | |
|---|---|---|---|---|---|
| | | Y | M | C | K |
| 8 | 19 | 42 | 92 | 5 | 123 |
| 22 | 45 | 7 | 186 | 24 | 88 |
| 46 | 51 | 10 | 48 | 176 | 34 |

CONTINUOUS COORDINATE DATA OF COMPOSITE IMAGE

OVERLAP DETERMINATION PROCESSING

OVERLAP DETERMINATION PROCESSING

START POINT PROCESSING WHEN OVERLAP EXISTS

START POINT PROCESSING WHEN OVERLAP EXISTS

NO PROCESSING PERFORMED

END POINT PROCESSING WHEN OVERLAP EXISTS

UPDATE BASE CONTINUOUS COORDINATES AS SUBJECT OF
COMPARISON WITH NEXT BASE CONTINUOUS COORDINATES

END POINT PROCESSING WHEN OVERLAP EXISTS

IMAGE COMPOSITION DEVICE, IMAGE FORMING APPARATUS AND COMPUTER READABLE MEDIUM STORING PROGRAM

CROSS-REFERENCE TO RELATED APPLICATIONS

This application is based on and claims priority under 35 USC 119 from Japanese Patent Application No. 2009-050097 filed Mar. 4, 2009.

BACKGROUND

1. Technical Field

The present invention relates to an image composition device, an image forming apparatus and a computer readable medium storing a program.

SUMMARY

According to an aspect of the invention, there is provided an image composition device including: a determination unit that determines an overlap state between respective pixel strings on corresponding lines in plural first image data pieces, having plural continuous pixels in the same color as a pixel string, including continuous coordinates with start point coordinate information and end point coordinate information of the pixel string, using the plural first image data pieces; and a composition unit that composes plural second image data pieces based on a result of determination by the determination unit.

BRIEF DESCRIPTION OF THE DRAWINGS

Exemplary embodiments of the present invention will be described in detail based on the following figures, wherein:

FIG. 7 is an explanatory view of selection of continuous coordinate data as subjects of comparison upon execution of overlap determination processing and composition processing;

DETAILED DESCRIPTION

Next, an exemplary embodiment of the present invention will be described in detail with reference to the drawings.

Figure 1:
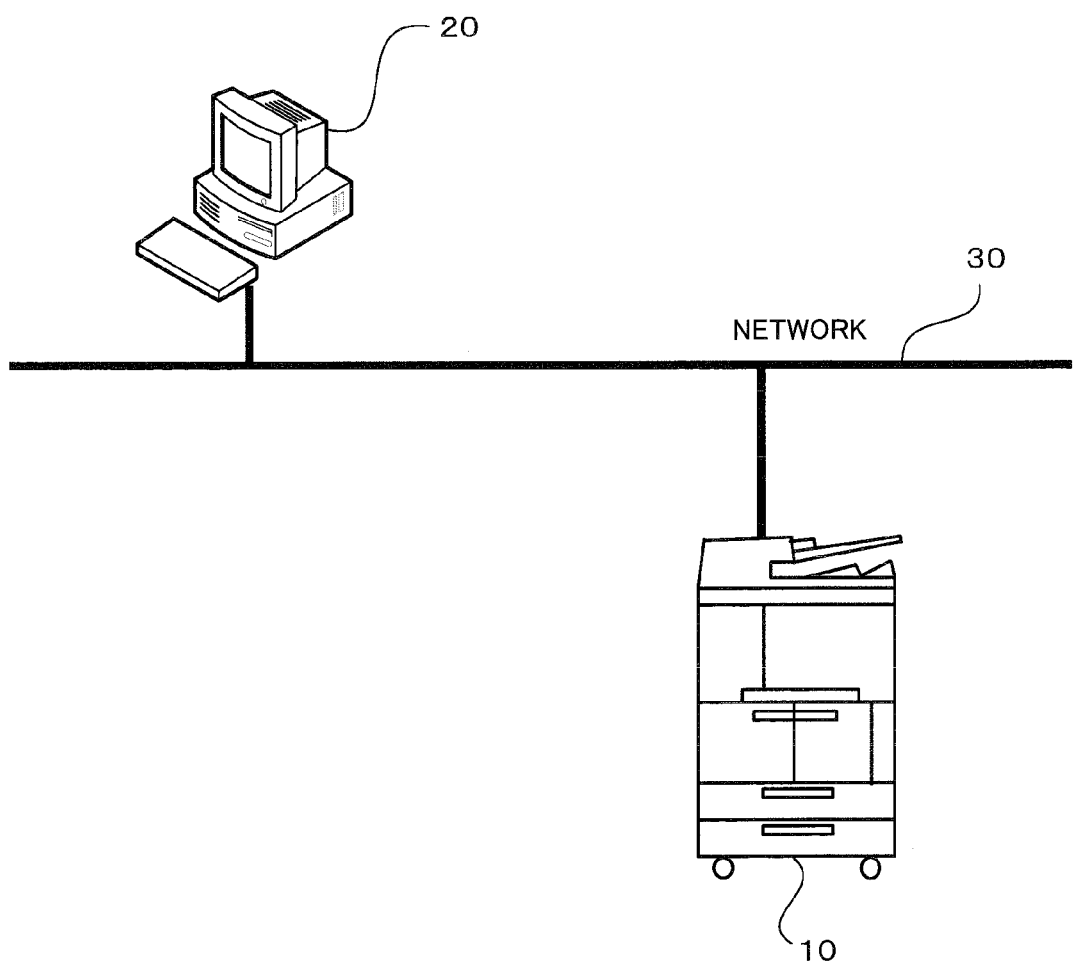
FIG. 1 illustrates a system configuration of an image forming system according to an exemplary embodiment of the present invention.

FIG. 1 shows a system configuration of an image forming system according to an exemplary embodiment of the present invention.

As shown in FIG. 1, the image forming system in the exemplary embodiment of the present invention has an image forming apparatus 10 and a terminal device 20 interconnected via a network 30. The terminal device 20 generates print data, and transmits the generated print data via the network 30 to the image forming apparatus 10. The image forming apparatus 10 receives the print data transmitted from the terminal device 20, and outputs an image corresponding to the print data on a print sheet. Note that the image forming apparatus 10 is a so-called multi-function machine having plural functions such as a print function, a scan function, a duplication (copying) function and a facsimile function.

Figure 2:
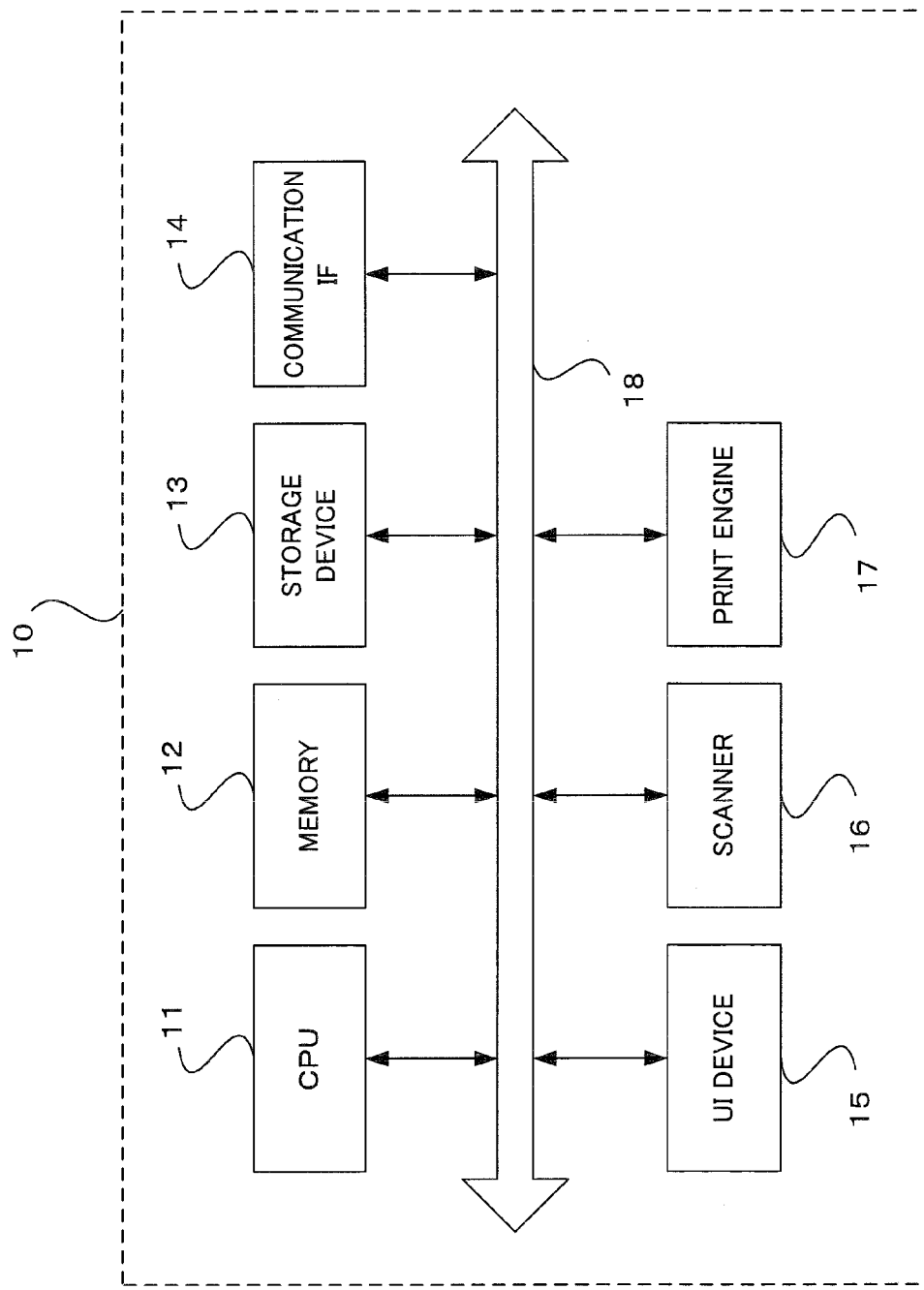
FIG. 2 is a block diagram showing a hardware configuration of an image forming apparatus 10 in the exemplary embodiment of the present invention.

Next, FIG. 2 shows a hardware configuration of the image forming apparatus 10 in the image forming system in the present exemplary embodiment.

As shown in FIG. 2, the image forming apparatus 10 has a CPU 11, a memory 12, a storage device 13 such as a hard disk drive (HDD), a communication interface (IF) 14 to perform data transmission/reception with an external device or the like via the network 30, a user interface (UI) device 15 including a touch panel or a liquid crystal display and a keyboard, a scanner 16, and a print engine 17. These constituent elements are interconnected via a control bus 18.

The CPU 11 performs predetermined processing based on a control program stored in the memory 12 or the storage device 13, to control the operation of the image forming apparatus 10. Note that in the present exemplary embodiment, the CPU 11 reads the control program stored in the memory 12 or the storage device 13 and executes the program; however, it may be arranged such that the program is stored on a storage medium such as a CD-ROM and provided to the CPU 11.

Figure 3:
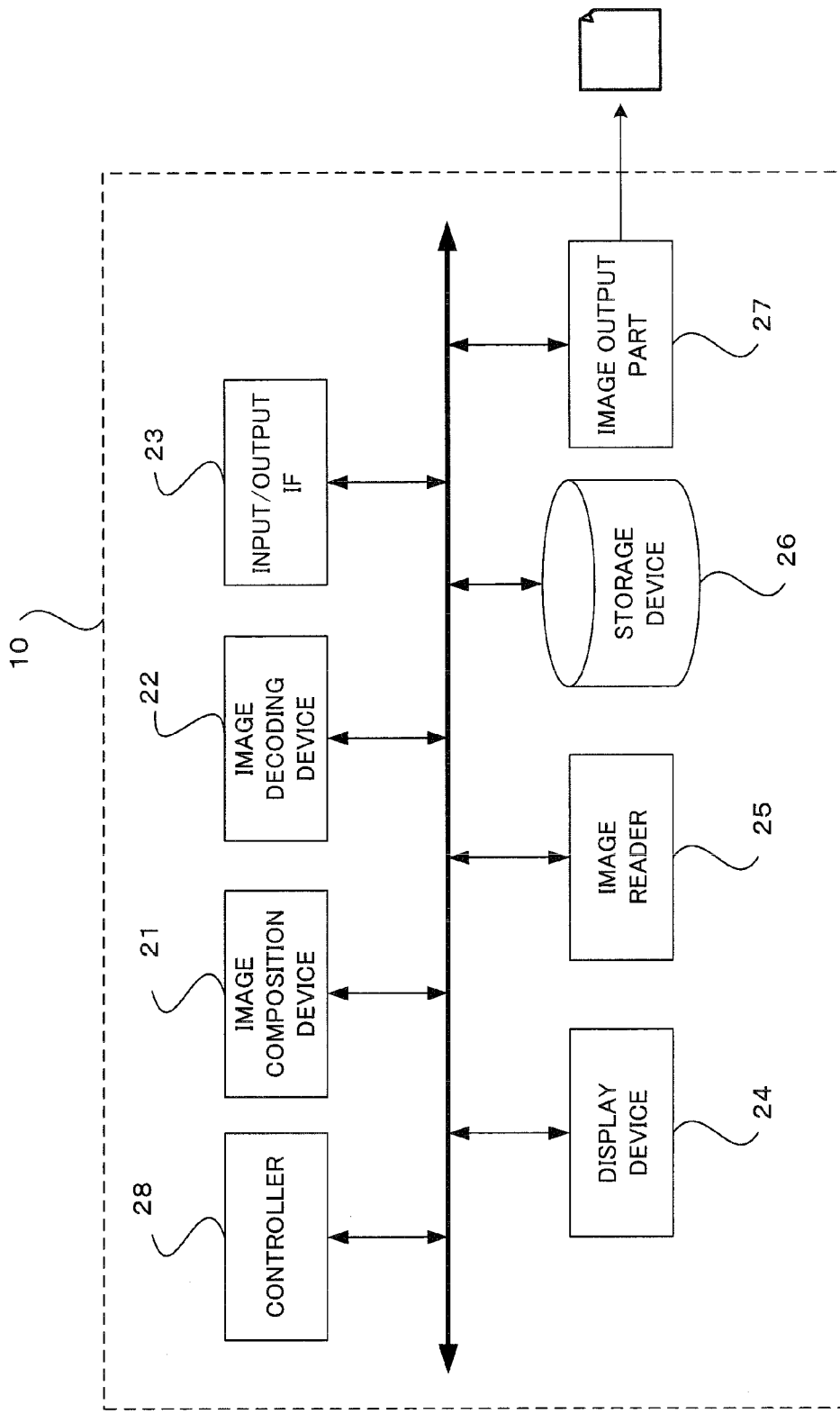
FIG. 3 is a block diagram showing a functional configuration of the image forming apparatus 10 in the exemplary embodiment of the present invention.

FIG. 3 is a block diagram showing a functional configuration of the image forming apparatus 10 realized by execution of the above-described control program.

As shown in FIG. 3, the image forming apparatus 10 in the present exemplary embodiment has an image composition device 21, an image decoding device 22, an input/output interface (IF) 23, a display device 24 to display various information for a user, an image reader 25, a storage device 26, an image output part 27 and a controller 28.

The input/output IF (interface) 23 performs data transmission/reception with the terminal device 20. The image reader 25 converts an original image to read image data based on a detected size of the original.

The storage device 26 holds image data read by the image reader 25, image data received via the input/output IF 23 and the like.

The image composition device 21 composes designated image data with the image data read by the image reader 25 or the image data received via the input/output IF 23, then compresses the data by coding and stores the coded data into the storage device 26.

The image decoding device 22 performs processing to decode the coded image data, stored in the storage device 26, to restore the original image data, or to, when image data transmitted from another image forming apparatus has been encoded, decode the coded image data.

The image output part 27 outputs the image data composed by the image composition device 21 on a print sheet in a designated size based on an output instruction. When an instruction to output the image data stored in a coded state in the storage device 26 is issued, the coded image data is decoded by the image decoding device 22 and then outputted by the image output part 27.

The controller 28 controls the operations of the image composition device 21 to the image output part 27 and the like, thereby performs various processing such as print processing and duplication processing.

Figure 4:
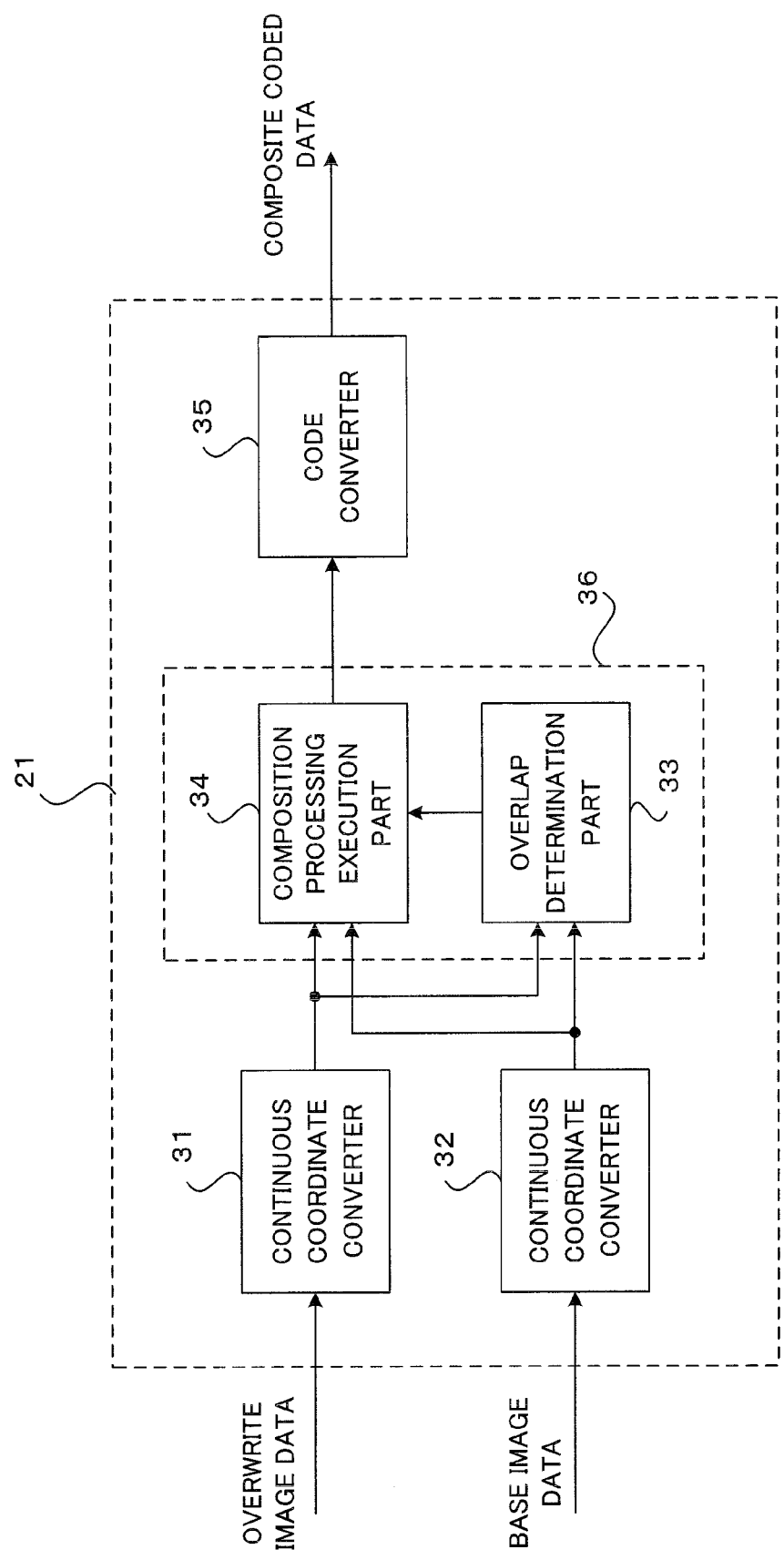
FIG. 4 is a block diagram showing a configuration of an image composition device 21 in the exemplary embodiment of the present invention.

Next, a configuration of the image composition device 21 in the present exemplary embodiment will be described. FIG. 4 is a block diagram showing the configuration of the image composition device 21 shown in FIG. 3.

As shown in FIG. 4, the image composition device 21 has continuous coordinate converters 31 and 32, an image composition part 36, and a code converter 35. Further, an image composition part 36 has an overlap determination part 33 and a composition processing execution part 34.

In the present exemplary embodiment, a case will be described where a base image and an overwrite image to be written over the base image are composed.

The continuous coordinate converters 31 and 32 convert pixel strings, having plural continuous pixels capable of representation of overwrite image data and base image data to be composed with the same color information, to image data respectively represented by continuous coordinate representation using start point coordinate information (a start point coordinate value), end point coordinate information (an end point coordinate value) and color information of the pixel string. Note that the start point indicates a head pixel of the pixel string, and the end point indicates an end pixel of the pixel string.

Figure 5:
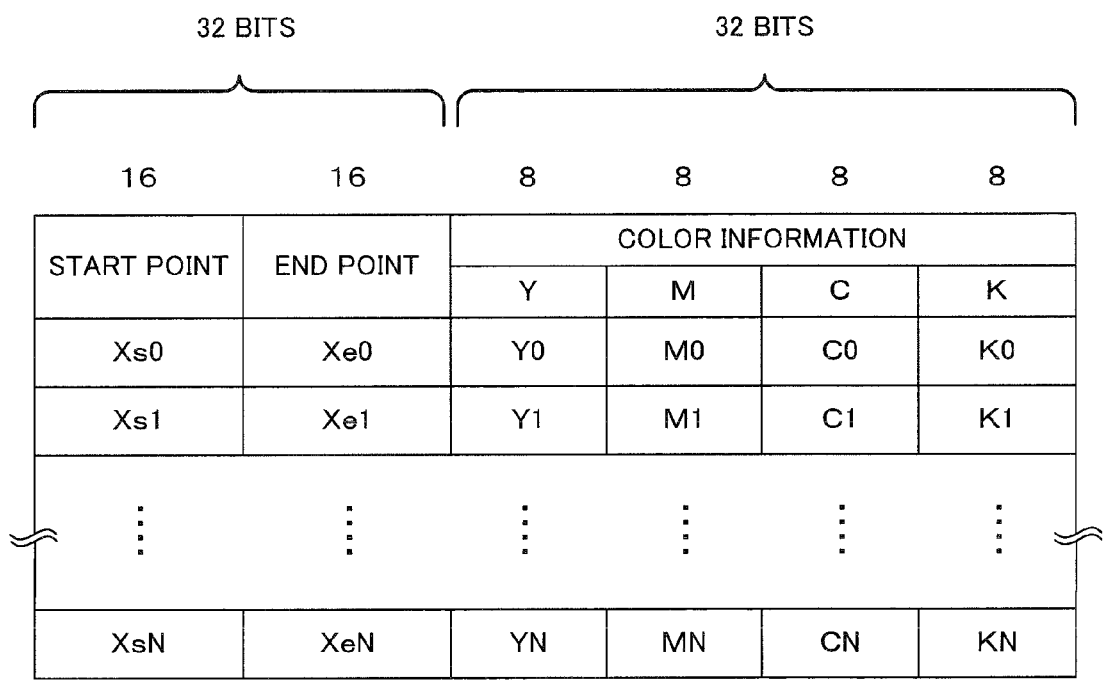
FIG. 5 illustrates an example of image data represented by continuous coordinate representation.

FIG. 5 illustrates an example of image data represented by this continuous coordinate representation. In FIG. 5, by pixel string on a certain line, a start point coordinate value, an end point coordinate value and color information are described. When a leftmost end in a scanning direction is 0, as the start point coordinate value and the end point coordinate value, values indicating the pixel positions of the start point and the end point are used. Further, in the present exemplary embodiment, as the color information, respective CMYK pixel values are represented by 256 gray levels.

In this continuous coordinate data, the respective numbers of bits of the start point coordinate value, the end point coordinate value and the color information are set in correspondence with required values for the input image or the system. For example, in the present exemplary embodiment, the start point coordinate value and the end point coordinate value are represented using 16 bits; however, 8 bits or 32 bits may be used. Further, the number of bits may be a number of bits easily processible in the system. For example, when a 32-bit CPU is used, the total number of bits of the start point coordinate value and the end point coordinate value is desirably 32 only from a viewpoint of processing load.

Further, regarding the color information, when respectively 8-bit CMYK image data is used, total 32-bit (8 bits×4) color information is prepared. Further, when a respectively 8-bit RGB image is used, 24-bit color information may be prepared, or dummy 8 bits may be added to the information as total 32-bit information.

Note that in the image data in continuous coordinate representation shown in FIG. 5, Y-direction (slow-scanning direction) coordinates are not described for prevention of increase in data amount by description of Y-direction coordinates. In this case, it is necessary to partition the continuous coordinate data by line or insert a marker indicating the end of 1-line data such as an EOL (End Of Line) marker at each line end. Further, Y-coordinates may be described by continuous coordinate data.

Further, although the start point coordinate value indicates a coordinate of the start of continuous pixel values, the end point coordinate value may be represented with the end pixel of the continuous pixel values or the pixel coordinate value next to the end pixel. As these two representations respectively have advantages and disadvantages, any one of them can be selected. In the present exemplary embodiment, the end point coordinate value is represented using the end pixel coordinate.

The overlap determination part 33 sequentially determines an overlap state between respective pixel strings on corresponding lines in overwrite image data and base image data represented by continuous coordinate representation. More particularly, the overlap determination part 33 determines presence/absence of overlap between the overwrite image and the base image on the respective lines. When an overlap exists, the overlap determination part 33 determines the positional relation (left side or right side in the fast-scanning direction) between the start point and the end point of the pixel string in the overwrite image and those of the pixel string in the base image.

The composition processing execution part 34 composes plural image data pieces based on the result of determination by the overlap determination part 33. Note that the details of composition processing by the composition processing execution part 34 will be described later.

The code converter 35 converts the image data in continuous coordinate representation composed by the composition processing execution part 34 to image data in another sign format such as general run-length code. Since the continuous coordinate representation itself has the effect of compression, the image data in continuous coordinate representation may be used as an output code without any conversion. However, in the present exemplary embodiment, in consideration of connection with an external existing decompressing device, the image data converted to run-length code data is outputted.

Although many methods are known as run-length coding methods, generally, a code has a run-length and a pixel value. Upon conversion from continuous coordinates, the run-length can be obtained by subtracting a start point coordinate value S from an end point coordinate value E and adding 1 to the result of subtraction. Further, the pixel value is directly obtained from the color information.

General run-length coding is performed on the premise of run continuation. Accordingly, it is necessary to insert a white run into a portion without a continuous coordinate. More particularly, when the end point coordinate value E of an immediately previous continuous coordinates and the start point coordinate value S of an immediately subsequent continuous coordinates are not adjacent to each other, processing is performed on the assumption that white continuous coordinates exist between a coordinate value E+1 and a coordinate value S−1.

Note that although the expression "white" is used for the sake of convenience, the color indicates a default color in the system. For example, in a display system, black may be a default color. In such case, a black run is inserted. Otherwise, especially to display a transparent color, a system to designate a special color or a pixel value pattern may be used.

Next, the operation of the image composition device 21 in the present exemplary embodiment will be described in detail with reference to the drawings.

Figure 6:
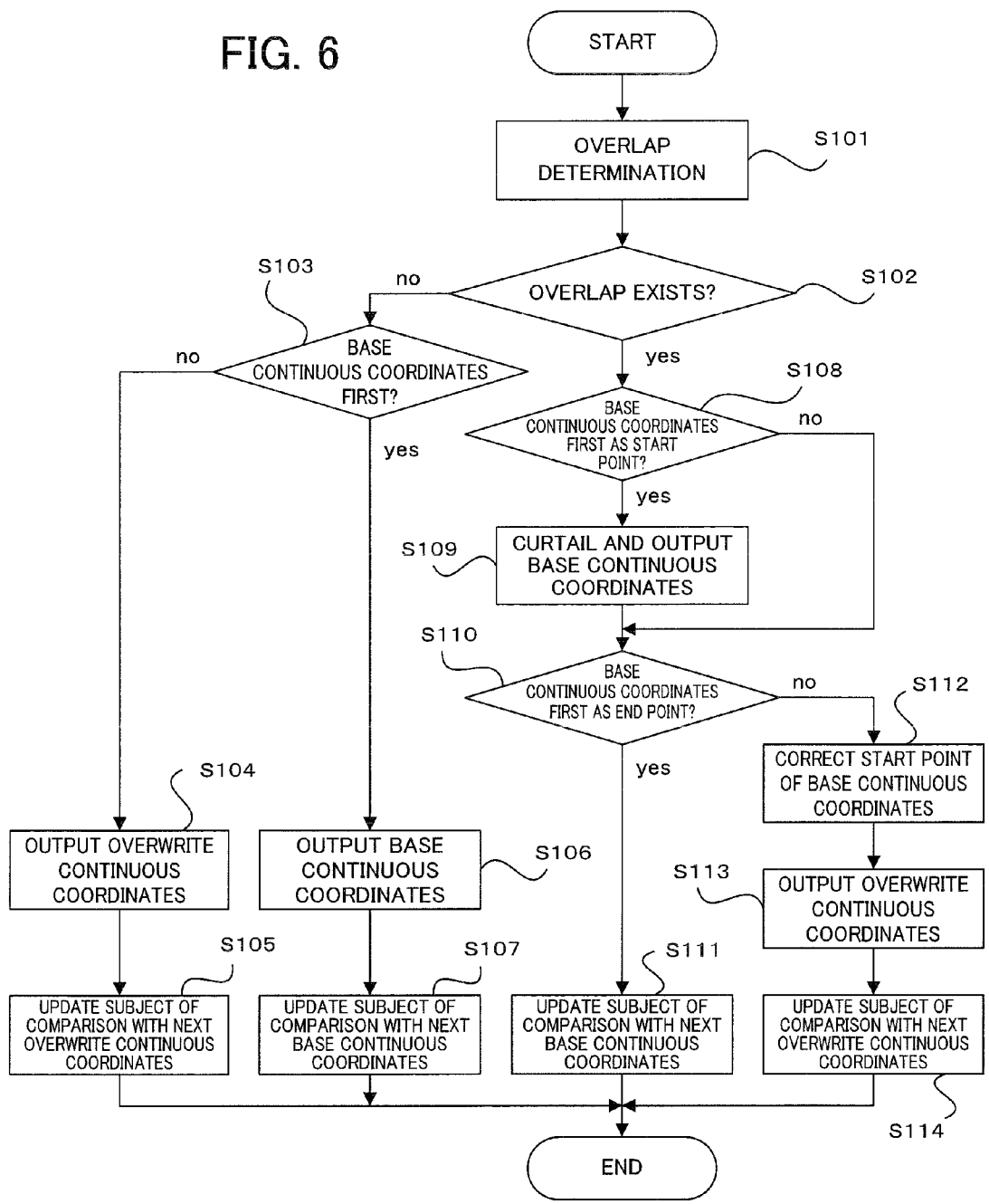
FIG. 6 is a flowchart showing operations of an overlap determination part 33 and a composition processing execution part 34 in the image composition device 21 in the exemplary embodiment of the present invention.

FIG. 6 is a flowchart showing operations of the overlap determination part 33 and the composition processing execution part 34 in the image composition device 21 in the present exemplary embodiment.

First, the overlap determination part 33 determines presence/absence of overlap between overwrite image data and base image data represented by continuous coordinate representation (step S101).

As shown in FIG. 7, in the overlap determination, one piece of continuous coordinate data of a 1-line overwrite image (in some cases, abbreviated to "overwrite continuous coordinate data") and one piece of continuous coordinate data of a base image (in some cases, abbreviated to "base continuous coordinate data") are selected as continuous coordinate data to be subjects of comparison, and overlap determination is performed between the selected continuous coordinate data pieces.

Figure 8A:
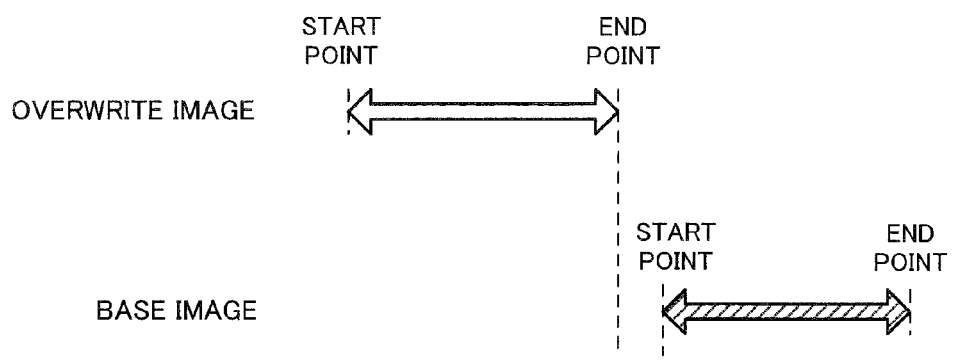
FIGS. 8A and 8B are explanatory views of a particular method for the overlap determination processing.
Figure 8B:
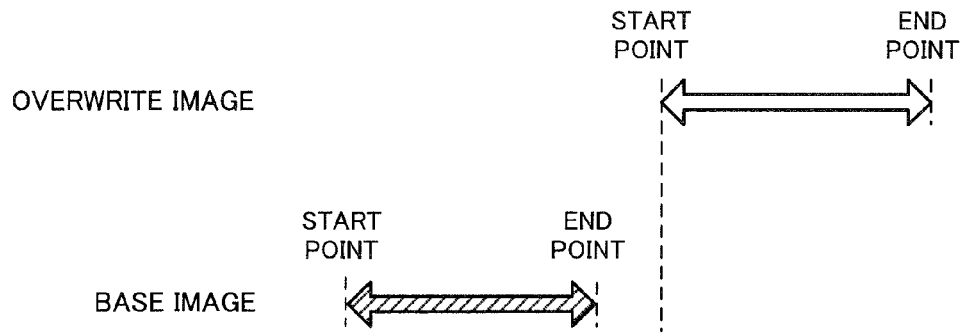

As a particular method for the overlap determination processing, as shown in FIGS. 8A and 8B, when one of the following conditions 1 and 2 is established, it is determined that no overlap exists between the continuous coordinate data as the subjects of comparison.

Condition 1: end point coordinate value in overwrite continuous coordinate data<start point coordinate value in base continuous coordinate data Condition 2: end point coordinate value in base continuous coordinate data<start point coordinate value in overwrite continuous coordinate data That is, when the condition 1 is established, two pixel strings in the overwrite image and the base image are in a state as shown in FIG. 8A. When the condition 2 is established, the two pixel strings are in a state as shown in FIG. 8B.

Then, based on the result of overlap determination at step S101, the composition processing execution part 34 performs composition processing between the continuous coordinate data of the base image and the continuous coordinate data of the overwrite image.

More particularly, when no overlap exists between the continuous coordinate data of the base image and the continuous coordinate data of the overwrite image (step S102), the precedence of the base continuous coordinate data or the overwrite continuous coordinate data is determined (step S103).

At this step S103, when it is determined that the overwrite continuous coordinate data is the preceding data, that is, when the two pixel strings are in the state as shown in FIG. 8A (No at step S103), the overwrite continuous coordinate data is outputted as composite output data (step S104). Then, the next continuous coordinate data is selected from unprocessed overwrite continuous coordinate data and the overwrite continuous coordinate data as the subjects of comparison is updated (step S105).

When it is determined at step S103 that the base continuous coordinate data is the preceding data, that is, when the two pixel strings are in the state as shown in FIG. 8B (Yes at step S103), the base continuous coordinate data is outputted as the composite output data (step S106). Then, the next continuous coordinate data is selected from unprocessed base continuous coordinate data and the base continuous coordinate data as the subjects of comparison is updated (step S107).

When it is determined at step S102 that there is an overlap between the continuous coordinate data of the base image and the continuous coordinate data of the overwrite image (Yes at step S102), the composition processing execution part 34 performs the composition processing based on the positional relation between the start point coordinate values and between the end point coordinate values in the overwrite continuous coordinate data and the base continuous coordinate data.

Figure 9A:
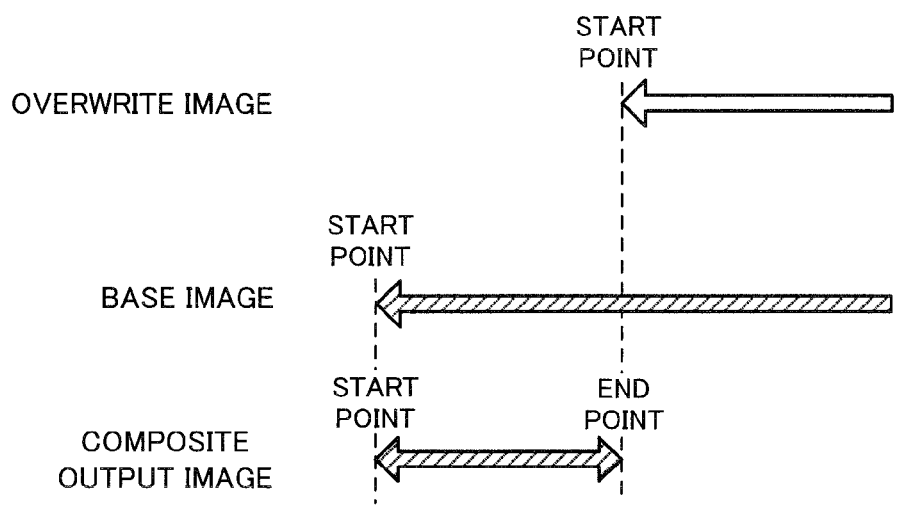
FIGS. 9A and 9B are explanatory views of start point processing when an overlap exists.
Figure 9B:
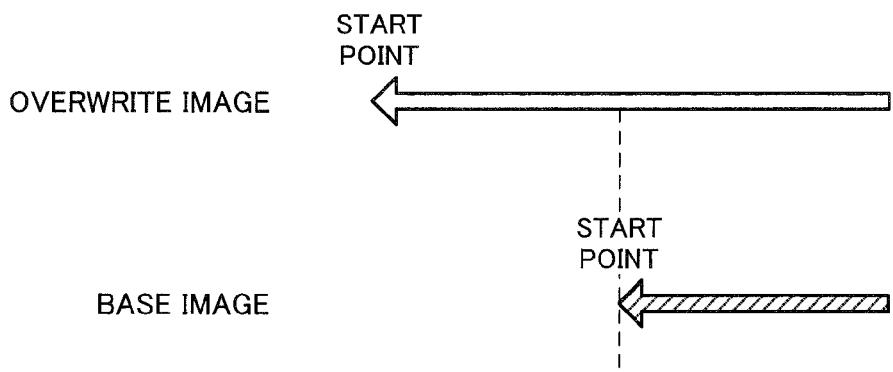

First, the precedence of the start point coordinate value in the base continuous coordinate data or that in the overwrite continuous coordinate data is determined (step S108). Then, when the start point coordinate value in the base continuous coordinate data is the preceding data (Yes at step S108), the end point coordinate value in the base continuous coordinate data is curtailed to be close to the start point coordinate value in the overwrite continuous coordinates by 1 pixel, as shown in FIG. 9A, and the base continuous coordinate data is outputted as a composite image (step S109). Further, when the start point coordinate value in the overwrite continuous coordinate data is the preceding data as shown in FIG. 9B (No at step S108), no processing is performed.

Figure 10A:
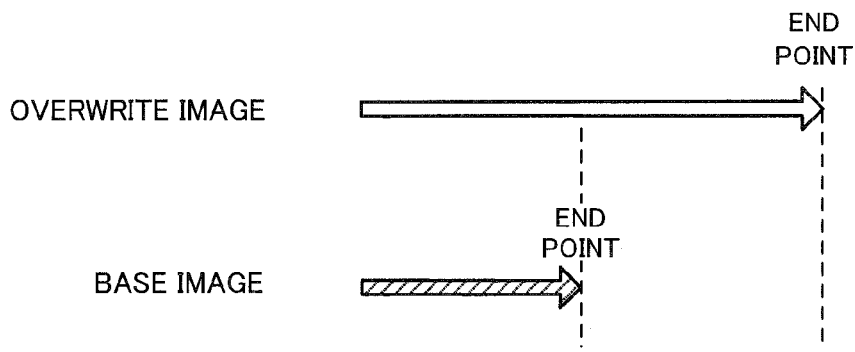
FIGS. 10A and 10B are explanatory views of end point processing when an overlap exists.
Figure 10B:
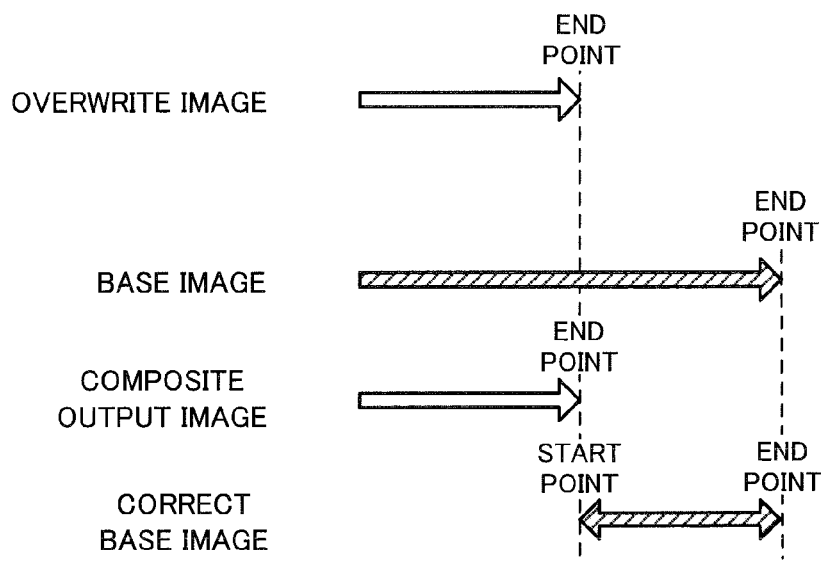

Next, the precedence of the end point coordinate value in the base continuous coordinate data or that in the overwrite continuous coordinate data is determined (step S110). As shown in FIG. 10A, when the end point coordinate value in the base continuous coordinate data is the preceding data (Yes at step S110), the subject of comparison is updated with the next base continuous coordinate (step S111). Further, as shown in FIG. 103, when the end point coordinate value in the overwrite continuous coordinate data is the preceding data (No at step S110), the start point coordinate value in the base continuous coordinate data is corrected to the next coordinate value to the end point coordinate value in the overwrite continuous coordinate data (step S112). Then, the overwrite continuous coordinate data is outputted as a composite image (step S113), and the subject of comparison is updated with the next overwrite continuous coordinate data (step S114).

The processing shown in the flowchart of FIG. 6 is performed by line, and the end edge of each line is determined using e.g. an EOL marker. The EOL marker may be a continuous coordinate having all 0 values. Further, the EOL marker may be omitted by holding the number of continuous coordinates by line in a management table, or dividing a continuous coordinate by line. The EOL marker can be omitted by adding a Y coordinate to continuous coordinates. In this case, however, the amount of data in the continuous coordinates is increased.

Note that for the sake of simplicity of explanation, in the processing shown in FIG. 6, processing at the line end edge is omitted. At the time of updating with the next continuous coordinates, when continuous coordinates do not exist at one end of the line, all the remaining continuous coordinates at the other end are outputted as a composite image. For example, when there becomes no base continuous coordinate, all the remaining overwrite continuous coordinates on the line are outputted as a composite image.

Figure 11A:
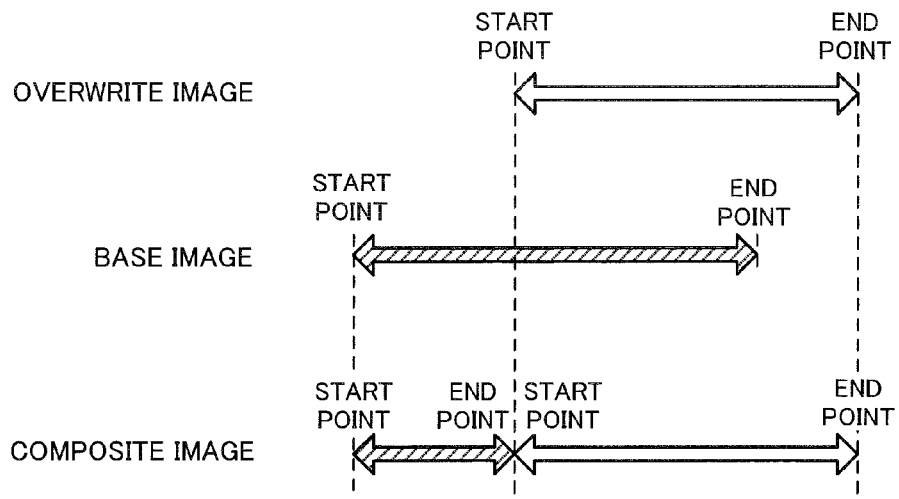
FIGS. 11A and 11B are explanatory views of an example where the image composition processing is performed.
Figure 11B:
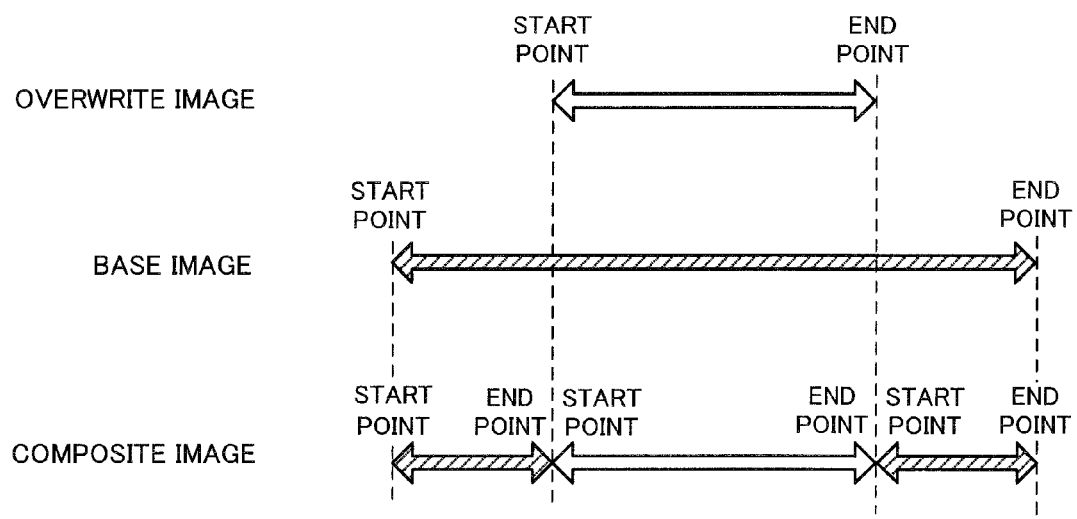
Figure 12A:
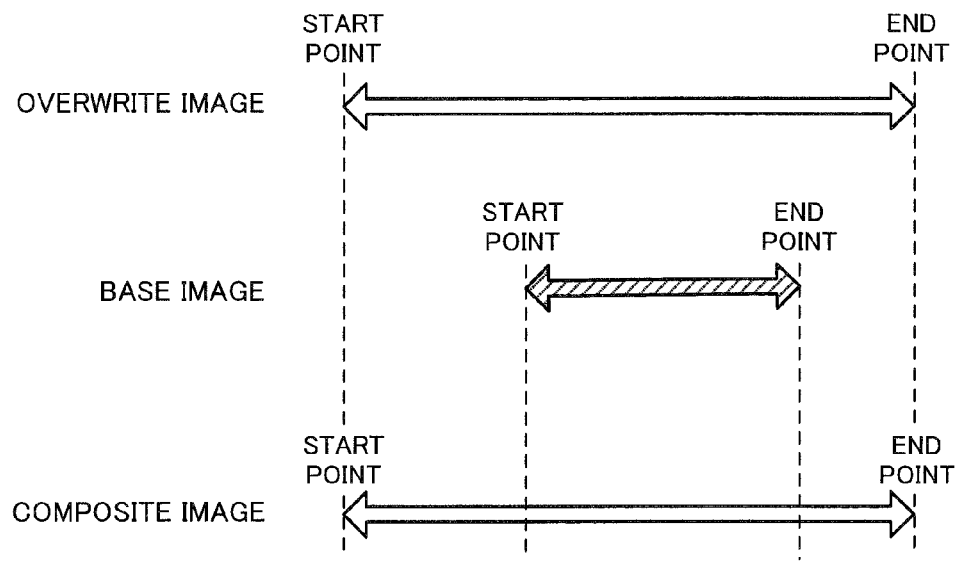
FIGS. 12A and 12B are explanatory views of another example where the image composition processing is performed.
Figure 12B:
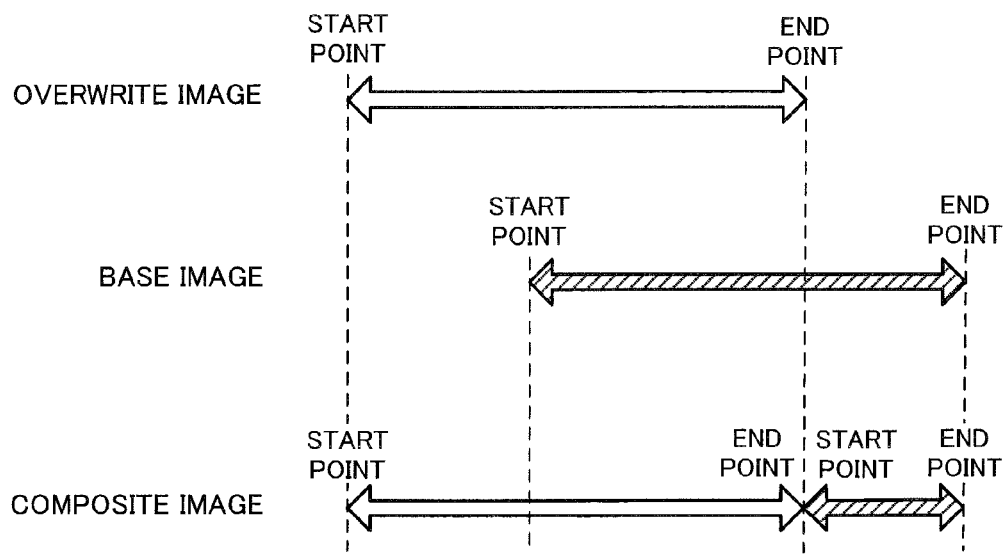

FIGS. 11A and 11B and FIGS. 12A and 12B show examples of the above image composition processing. In FIG. 11A, since a part of the base image overlaps the overwrite image, as a result of composition processing, the base image is curtailed. Further, in FIG. 11B, since the overwrite image overlaps a central portion of the base image, the base image is divided into two pixel strings. Further, in FIG. 12A, the entire base image overlaps the overwrite image, and as a result of composition processing, the base image is lost. Further, in FIG. 12B, the front side of the base image overlaps the overwrite image, and as a result of composition processing, only the rear side of the base image remains.

Next, buffer management upon execution of the composition processing by the image composition device 21 in the present exemplary embodiment will be described.

Figure 13:
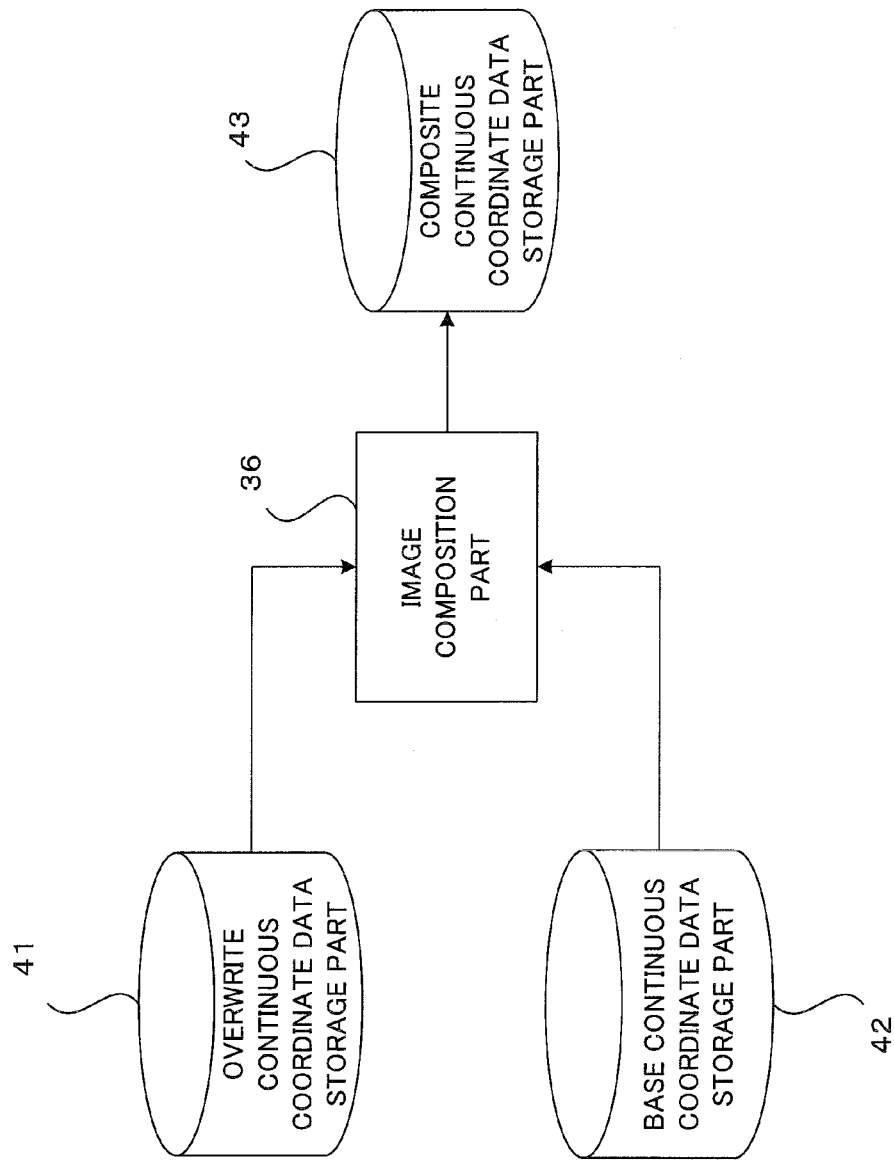
FIG. 13 is a block diagram showing an example of buffer management in execution of the composition processing in the image composition device 21 according to the exemplary embodiment of the present invention.

As the simplest configuration, the composition processing can be realized with a memory for storing overwrite coordinate data and base continuous coordinate data for 1 page and a memory for storing composite continuous coordinate data for 1 page. FIG. 13 shows an example of such configuration. In the example shown in FIG. 13, an overwrite continuous coordinate data storage part 41, a base continuous coordinate data storage part 42, and a composite continuous coordinate data storage part 43 are connected to the image composition part 36.

Figure 14:
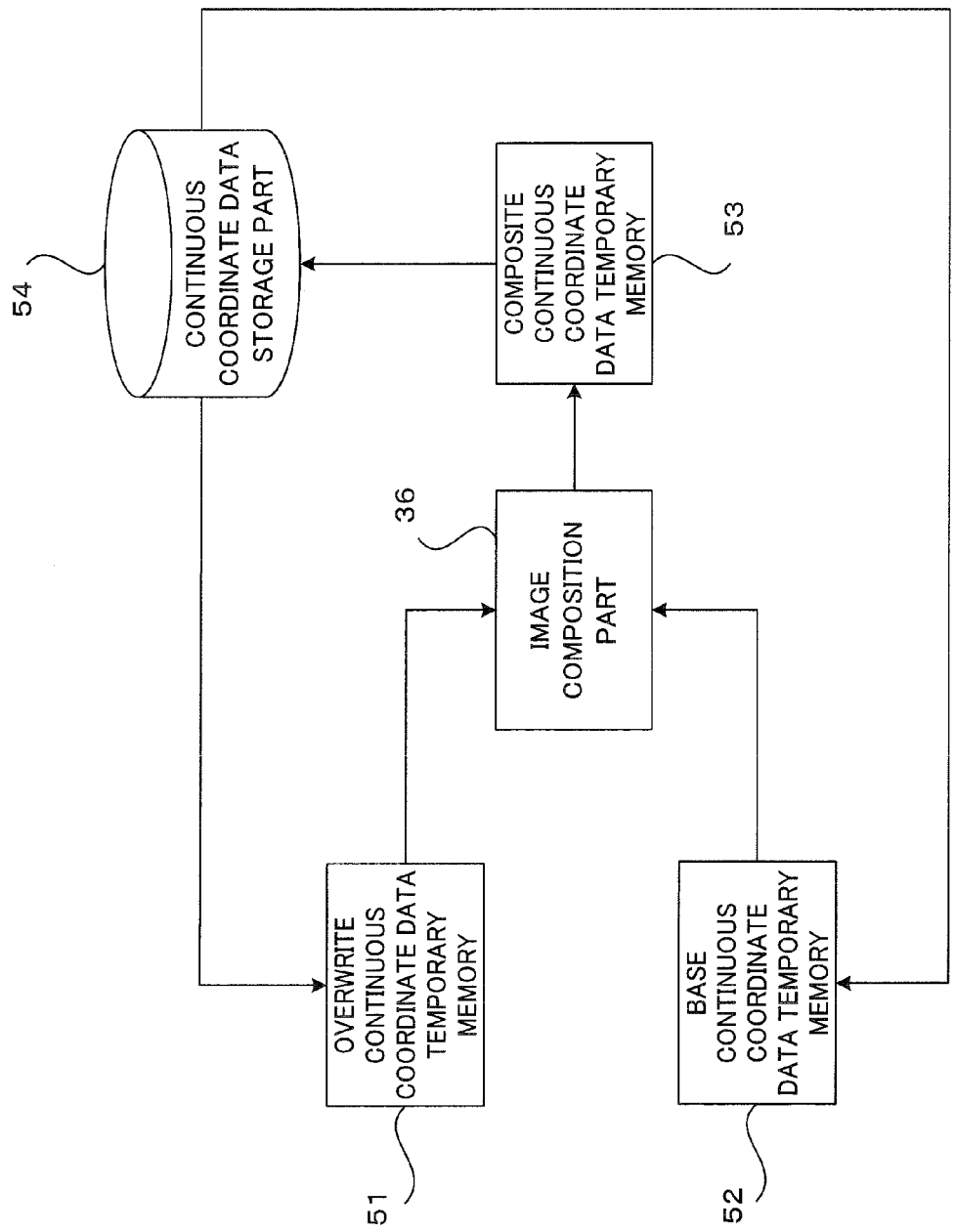
FIG. 14 is a block diagram showing another example of the buffer management in execution of the composition processing in the image composition device 21 according to the exemplary embodiment of the present invention.

To realize the image composition processing with a smaller memory capacity than that in the configuration shown in FIG. 13, it may be arranged such that both the input and output sides perform sequential input/output. FIG. 14 shows an example of such configuration. In the example shown in FIG. 14, an overwrite continuous coordinate data temporary memory 51, a base continuous coordinate data temporary memory 52, and a composite continuous coordinate data temporary memory 53 are connected to the image composition part 36. Further, for the overwrite continuous coordinate data temporary memory 51 and the base continuous coordinate data temporary memory 52, a continuous coordinate data storage part 54 is provided for update of continuous coordinate data or storage of continuous coordinate data of a composite image stored in the composite continuous coordinate data temporary memory 53. In the processing in this configuration, the flow of data upon input and that upon output are both in one direction. In accordance with data, there is a possibility that input is proceeded only on the overwrite image side or the base image side; however, the input is not reversed. Further, as there is no data skip, high-speed processing such as look-ahead processing can be effectively performed. The work memory can be minimized by utilizing the above features. For example, it may be arranged such that the overwrite continuous coordinate data temporary memory 51, the base continuous coordinate data temporary memory 52 and the composite continuous coordinate data temporary memory 53 are small-sized cache memories, and the continuous coordinate data storage part 54 is a large capacity HDD. In the image composition processing in the present exemplary embodiment, as random access is not necessary, it may be arranged such that the continuous coordinate data storage part 54 is not realized with a HDD but is realized by network connection.

Further, another example of the buffer management upon execution of the composition processing in the present exemplary embodiment will be described.

Figure 15:
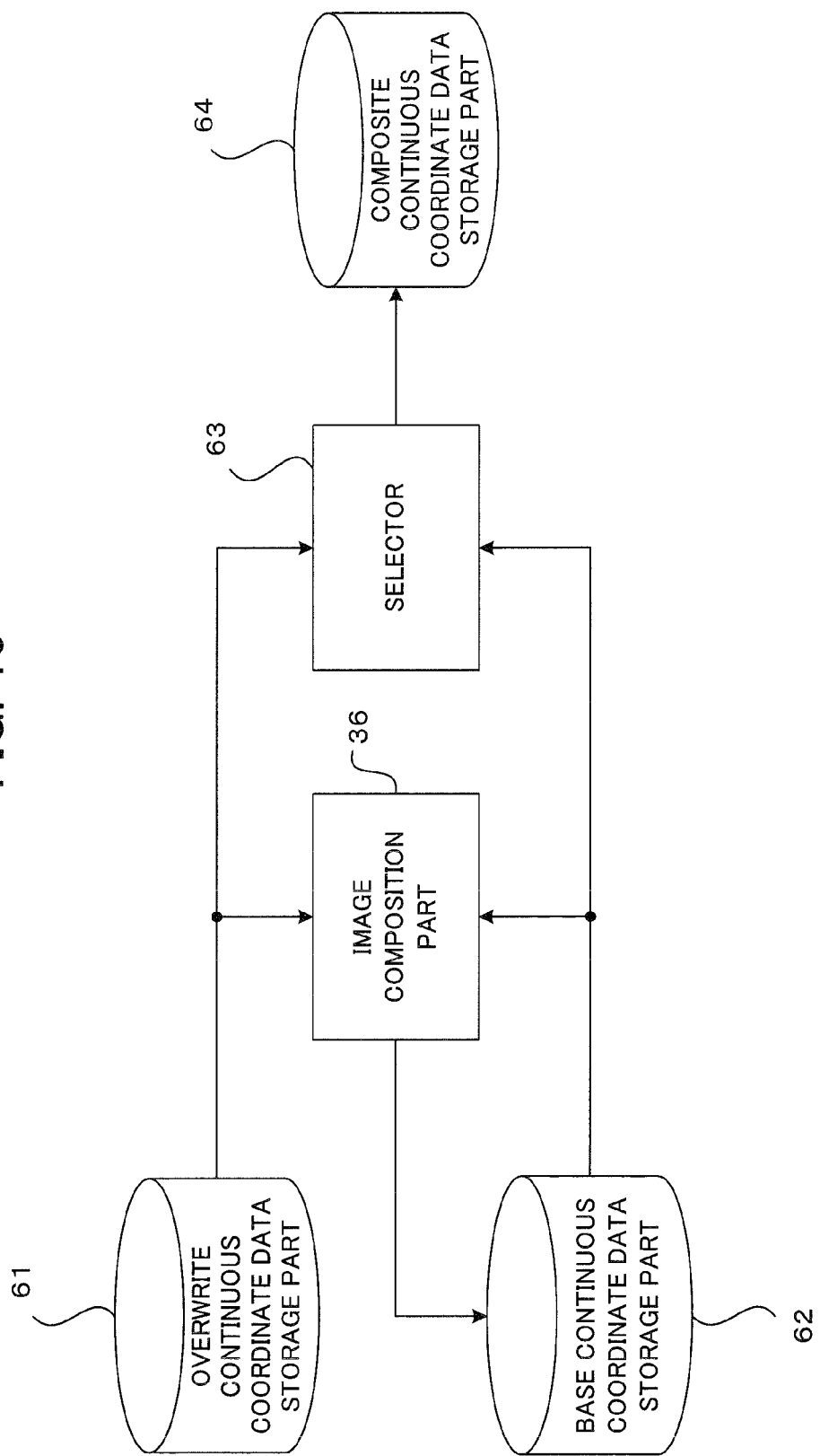
FIG. 15 is a block diagram showing another example of the buffer management in execution of the composition processing in the image composition device 21 according to the exemplary embodiment of the present invention.

When an image output device which operates in real time is connected as a subsequent stage of the image composition processing, for example, composite continuous coordinates are to be outputted in real time. The processing load on the composition processing in the present exemplary embodiment is light. However, since output is not always performed in accordance with condition as described in FIG. 6, it is difficult to perform output continuously. As a configuration in such case, it may be arranged such that necessary update processing is first performed on the base continuous coordinate data, and thereafter output is performed while the overwrite continuous coordinate data and the processed base continuous coordinate data are composed. FIG. 15 shows an example of the configuration to realize this processing.

In the configuration shown in FIG. 15, an overwrite continuous coordinate data storage part 61, a base continuous coordinate storage part 62, and a selector 63 are connected to the image composition part 36. Further, a composite continuous coordinate storage part 64 holds continuous coordinate data of a composite image outputted from the selector 63.

In the configuration shown in FIG. 15, the image composition processing is performed in two phases.

In the first phase, the image composition part 36 performs the composition processing. However, output is not performed, and the updated base continuous coordinate data is written back in the base continuous coordinate data storage part 62. As shown in FIG. 10A, when a base continuous coordinate data not to be outputted exists, the base continuous coordinate data is deleted.

In the second phase, the selector 63 selectively outputs smaller one of the updated base continuous coordinate data and the overwrite continuous coordinate data. The outputted one of the continuous coordinate data is updated with the next data. At this time, since an overlap between the continuous coordinate data has been deleted, one of the continuous coordinate data is always outputted. This realizes continuous output.

MODIFICATION

In the above-described exemplary embodiment, two images, i.e., the base image and the overwrite image are composed. However, the present invention is not limited to this arrangement. The present invention is similarly applicable to a case where three or more images are composed.

Further, in the above-described exemplary embodiment, plural color images are composed. However, the present invention is not limited to this arrangement. The present invention is similarly applicable to a case where plural monochrome images are composed. In this case, for example, by previously arranging such that a pixel string having plural continuous black pixels is represented using continuous coordinate representation, the continuous coordinate representation avoids including color information.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image composition device comprising: a determination unit that: determines an overlap state between respective pixel strings on corresponding lines in a plurality of first image data pieces by determining whether an overlap exists between overwrite image data and base image data represented by continuous coordinate representation, wherein each of first image data pieces comprises a plurality of continuous pixels and are composed of the same color information, and determines, in response to determining an overlap exists between the respective first image data pieces, a positional relationship between a pixel string in the overwrite image data and a pixel string in the base image data; a composition unit that composes a plurality of second image data pieces based on a result of determination by the determination unit using the positional relationship of the plurality of first image data pieces; and wherein determining the positional relationship between a pixel string in the overwrite image data and a pixel string in the base image data comprises: identifying a positional relationship between a start point and an end point of an overwrite pixel string in the overwrite image data and a start point and an end point of a base pixel string in the base image data, determining if the start point of the base pixel string precedes the start point of the overwrite pixel string, and determining if the end point of the overwrite pixel string precedes the end point of the base pixel string.

2. The image composition device according to claim 1, wherein the continuous coordinates include color information of the pixel strings.

3. The image composition device according to claim 1, further comprising a converter that converts a plurality of third image data pieces to the plurality of first image data pieces.

4. The image composition device according to claim 1, further comprising a code converter that converts the plurality of second image data pieces to image data in a different sign format.

5. The image composition device according to claim 3, further comprising a code converter that converts the plurality of second image data pieces to image data in a different sign format.

6. The image composition device according to claim 1, wherein the plurality of first image data pieces have base image data and overwrite image data written over the base image data.

7. The image composition device according to claim 1, wherein the composing a plurality of second image data pieces based on a result of determination by the determination unit comprises: in response to determining that the start point of the base pixel string precedes the start point of the overwrite pixel string, creating corrected base image data comprising the start point of the base pixel string and an end point being proximate to the start point of the overwrite pixel string, and in response to determining that the end point of the overwrite pixel string precedes the end point of the base pixel string, creating composite image data having a start point being the end point of the overwrite pixel string and an end point being the end point of the base pixel string.

8. The image composition device according to claim 2, further comprising a converter that converts a plurality of third image data pieces to the plurality of first image data pieces.

9. The image composition device according to claim 2, further comprising a code converter that converts the plurality of second image data pieces to image data in a different sign format.

10. The image composition device according to claim 2, wherein the plurality of first image data pieces have base image data and overwrite image data written over the base image data.

11. The image composition device according to claim 3, wherein the plurality of first image data pieces have base image data and overwrite image data written over the base image data.

12. An image forming apparatus comprising: a determination unit that: determines an overlap state between respective pixel strings on corresponding lines in a plurality of first image data pieces by determining whether an overlap exists between overwrite image data and base image data represented by continuous coordinate representation, wherein each of first image data piece comprises a plurality of continuous pixels and are composed of the same color information, and determines, in response to determining an overlap exists between the respective first image data pieces, a positional relationship between a pixel string in the overwrite image data and a pixel string in the base image data; a composition unit that composes a plurality of second image data pieces based on a result of determination by the determination unit using the positional relationship of the plurality of first image data pieces; an image output unit that outputs an image based on the plurality of second image data pieces; and wherein determining the positional relationship between a pixel string in the overwrite image data and a pixel string in the base image data comprises: identifying a positional relationship between a start point and an end point of an overwrite pixel string in the overwrite image data and a start point and an end point of a base pixel string in the base image data, determining if the start point of the base pixel string precedes the start point of the overwrite pixel string, and determining if the end point of the overwrite pixel string precedes the end point of the base pixel string.

13. The image forming apparatus according to claim 12, wherein the continuous coordinates include color information of the pixel strings.

14. The image forming apparatus according to claim 12, wherein the plurality of first image data pieces have base image data and overwrite image data written over the base image data.

15. The image forming apparatus according to claim 13, further comprising a converter that converts a plurality of third image data pieces to the plurality of first image data pieces.

16. A non-transitory computer readable medium storing a program causing a computer to execute a process for image composition, the process comprising: determining an overlap state between respective pixel strings on corresponding lines in a plurality of first image data pieces by determining whether an overlap exists between overwrite image data and base image data represented by continuous coordinate representation, wherein each of first image data pieces comprises a plurality of continuous pixels and are composed of the same color information, and determining, in response to determining an overlap exists between the respective first image data pieces, a positional relationship between a pixel string in the overwrite image data and a pixel string in the base image data; composing a plurality of second image data pieces based on a result of determination using the positional relationship of the plurality of first image data pieces; and wherein determining the positional relationship between a pixel string in the overwrite image data and a pixel string in the base image data comprises: identifying a positional relationship between a start point and an end point of an overwrite pixel string in the overwrite image data and a start point and an end point of a base pixel string in the base image data, determining if the start point of the base pixel string precedes the start point of the overwrite pixel string, and determining if the end point of the overwrite pixel string precedes the end point of the base pixel string.

17. The non-transitory computer readable medium according to claim 16, wherein the continuous coordinates include color information of the pixel string.

18. The non-transitory computer readable medium according to claim 16, holding a program to cause the computer to perform conversion of a plurality of third image data pieces to the plurality of first image data pieces.

19. The non-transitory computer readable medium according to claim 16, wherein the plurality of first image data pieces have base image data and overwrite image data written over the base image data.

* * * * *